US010565699B2

(12) United States Patent
Bae et al.

(10) Patent No.: US 10,565,699 B2
(45) Date of Patent: Feb. 18, 2020

(54) APPARATUS AND METHOD FOR DETECTING ANOMALY IN PLANT PIPE USING MULTIPLE META-LEARNING

(71) Applicants: Electronics and Telecommunications Research Institute, Daejeon (KR); KOREA ATOMIC ENERGY RESEARCH INSTITUTE, Daejeon (KR)

(72) Inventors: Ji Hoon Bae, Daejeon (KR); Gwan Joong Kim, Daejeon (KR); Se Won Oh, Daejeon (KR); Doo Byung Yoon, Daejeon (KR); Wan Seon Lim, Daejeon (KR); Kwi Hoon Kim, Daejeon (KR); Nae Soo Kim, Daejeon (KR); Sun Jin Kim, Daejeon (KR); Cheol Sig Pyo, Daejeon (KR)

(73) Assignees: ELECTRONICS AND TELECOMMUNICATIONS RESEARCH INSTITUTE, Daejeon (KR); KOREA ATOMIC ENERGY RESEARCH INSTITUTE, Daejeon (KR)

(*) Notice: Subject to any disclaimer, the term of this patent is extended or adjusted under 35 U.S.C. 154(b) by 122 days.

(21) Appl. No.: 15/950,408

(22) Filed: Apr. 11, 2018

(65) Prior Publication Data
US 2018/0293723 A1 Oct. 11, 2018

(30) Foreign Application Priority Data
Apr. 11, 2017 (KR) .................. 10-2017-0046884

(51) Int. Cl.
*G06K 9/00* (2006.01)
*G06T 7/00* (2017.01)
(Continued)

(52) U.S. Cl.
CPC .......... *G06T 7/0004* (2013.01); *G06K 9/629* (2013.01); *G06K 9/6262* (2013.01); *G06N 20/00* (2019.01);
(Continued)

(58) Field of Classification Search
CPC combination set(s) only.
See application file for complete search history.

(56) References Cited

U.S. PATENT DOCUMENTS

| 5,182,775 A  * | 1/1993 | Matsui .................. B23K 31/12 348/125 |
| 2002/0006216 A1* | 1/2002 | Armato, III .......... G06T 7/0012 382/131 |

(Continued)

FOREIGN PATENT DOCUMENTS

| JP | 2006-135412 | 5/2006 |
| JP | 2006-258535 | 9/2006 |

(Continued)

OTHER PUBLICATIONS

Duran, Automated Pipe Defect Detection and Categorization Using Camera/Laser-Based Profiler and Artificial Neural Network, Jan. 2007, IEEE, IEEE Transactions on Automation Science and Engineering (Year: 2007).*

(Continued)

*Primary Examiner* — Alex Kok S Liew
(74) *Attorney, Agent, or Firm* — Kile Park Reed & Houtteman PLLC

(57) ABSTRACT

Provided are an apparatus and method for detecting an anomaly in a plant pipe using multiple meta-learning. When a multi-sensor data stream about a plant pipe is received, each of a plurality of meta-learning modules for processing different packet section ranges, extracts one or more preset types of features from sensor data of packet section ranges (Continued)

set according to trend from an arbitrary reception time point, generates 2D image features of the features according to multi-sensor-specific times, generates 3D volume features by accumulating the 2D image features in a depth direction according to multiple sensors, and learns the 3D volume features in parallel through multi-sensor-specific learning modules. Results of the learning of the meta-learning modules are aggregated, and it is determined whether there is an anomaly in a plant pipe according to a learning result selected based on an optimal combination of multiple features, multiple sensors, and multiple packet sections.

17 Claims, 13 Drawing Sheets

(51) Int. Cl.
*G06K 9/62* (2006.01)
*G06N 20/00* (2019.01)

(52) U.S. Cl.
CPC .................. *G06T 2200/04* (2013.01); *G06T 2207/20081* (2013.01); *G06T 2207/20084* (2013.01)

(56) References Cited

U.S. PATENT DOCUMENTS

| | | | |
|---|---|---|---|
| 2002/0009224 A1* | 1/2002 | Gatti | G06T 15/08 382/154 |
| 2003/0023404 A1* | 1/2003 | Moselhi | G01N 21/954 702/181 |
| 2005/0197803 A1 | 9/2005 | Eryurek et al. | |
| 2006/0210141 A1 | 9/2006 | Kojitani et al. | |
| 2010/0057649 A1 | 3/2010 | Lee et al. | |
| 2012/0150775 A1 | 6/2012 | Son et al. | |
| 2013/0073260 A1 | 3/2013 | Maeda et al. | |
| 2016/0071024 A1 | 3/2016 | Amer et al. | |
| 2016/0082965 A1 | 3/2016 | Jeon | |

FOREIGN PATENT DOCUMENTS

| | | |
|---|---|---|
| JP | 2011-227706 | 11/2011 |
| JP | 2012-89057 | 5/2012 |
| JP | 2013-54779 | 3/2013 |
| KR | 10-1484249 | 1/2015 |

OTHER PUBLICATIONS

Abhishek Thakur; "Rules for Selecting Neural Network Architectures for AutoML-GPU Challenge"; JMLR: Workshop and Conference Proceedings 1:1-4, 2016; ICML 2016 Auto ML Workshop, Jun. 24, 2016, pp. 1-4.

* cited by examiner

APPARATUS AND METHOD FOR DETECTING ANOMALY IN PLANT PIPE USING MULTIPLE META-LEARNING

CROSS-REFERENCE TO RELATED APPLICATION

This application claims priority to and the benefit of Korean Patent Application No. 10-2017-0046884, filed on Apr. 11, 2017, the disclosure of which is incorporated herein by reference in its entirety.

BACKGROUND

1. Field of the Invention

The present invention relates to an apparatus and method for detecting an anomaly in a plant pipe using multiple meta-learning, and more particularly, to an apparatus and method for detecting an anomaly in a plant pipe which detect and predict anomalous behavior according to data measured by a plurality of sensors installed in a plant pipe.

2. Discussion of Related Art

Recently, in domestic and foreign power plants including nuclear power plants, pipes that were installed at the time of initial construction have aged, and cases of corrosion and leakage are occurring. These may cause economic loss in terms of industrial development and social problems such as environmental pollution. To solve these problems and stably run and maintain power plants, the need to detect and predict leakage of aged pipes in advance is increasing.

Accordingly, active research and technology development is underway to detect an anomaly in a plant pipe using various sensor devices. Related arts employ techniques for detecting leakage of a pipe using an auto-correlation function and a cross-correlation function of data, time and frequency patterns of measured data, a size of measured data, and the like in the time domain or the frequency domain of data measured by an acoustic sensor and a vibration sensor, the time-frequency domain, and the like. In addition, a method employing existing machine learning models and algorithms, such as an artificial neural network, a decision tree, clustering, and the like, based on collected data is used. In general, machine learning is a technology for refining collected data, classifying the refined data into training data and test data, learning/evaluating a training model, and then accurately processing data that is newly input after training using the learned model to analyze and predict information necessary for a new environment.

These days, with the significant development of deep learning technology that is modeled after human brain, machine learning based on the deep learning technology is being frequently applied to various fields, such as image recognition/processing, automatic voice recognition, video action recognition, natural language processing, and the like. Also, time-series leakage signal features of a plant pipe measured by acoustic sensors such as a microphone and an acoustic emission (AE) sensor, which are widely used in the field of plant industry to detect leakage, show overall that the amplitude of a signal increases in the time domain or a frequency spectrum magnitude increases in an audio frequency band of the frequency domain with an increase in size and pressure of a leaking portion.

Consequently, there is a necessity of a technology for applying the deep learning technology, which is powerful at pattern recognition, to time-series data measured by various kinds of sensors installed on a plant pipe to extract image and volume features obtained by applying multiple trends to time-series data measured from various kinds of data and to accurately detect an anomaly in a plant pipe through optimized fusion of these features and sensors.

SUMMARY OF THE INVENTION

The present invention is directed to providing an apparatus and method for detecting an anomaly in a plant pipe which detect and predict anomalous behavior of a plant pipe using meta-learning in which a plurality of image features are extracted from time-series data measured by a plurality of sensors installed in a plant pipe according to multiple trends of a short-term trend, an intermediate-term trend, and a long-term trend and are optimally fused.

The technical objects of the present invention are not limited to those described above, and other technical objects may exist.

According to an aspect of the present invention, there is provided an apparatus for detecting an anomaly in a plant pipe using multiple metal-learning, the apparatus including: a plurality of meta-learning modules configured to separately receive multi-sensor data streams from a plurality of sensors for processing sensing of a plant pipe and to process meta-learning with sensor data of packet section ranges set according to trend from an arbitrary reception time point; and a multi-trend meta-evaluator configured to detect an anomaly in a plant pipe by aggregating processing results of the meta-learning modules and output a detection result. Here, the plurality of meta-learning modules process multi-sensor data of packet sections having different lengths from the arbitrary reception time point. Also, each of the meta-learning modules generates two-dimensional (2D) image features by extracting one or more preset types of features from multi-sensor data collected from a set packet section range, generates three-dimensional (3D) volume features by accumulating the 2D image features in a depth direction according to the plurality of sensors, and learns the 3D volume features in parallel through learning modules separately corresponding to the sensors. Further, the multi-trend meta-evaluator determines whether there is an anomaly in the plant pipe by aggregating results learned based on optimal combinations of multiple features, multiple sensors, and multiple packet sections according to the plurality of meta-learning modules.

According to another aspect of the present invention, there is provided a method of detecting an anomaly in a plant pipe using multiple metal learning, the method including: receiving, by each of a plurality of meta-learning modules configured to process different packet section ranges, a multi-sensor data stream about a plant pipe; extracting, by each of the plurality of meta-learning modules, one or more preset types of features from sensor data of packet section ranges set according to trend from an arbitrary reception time point; generating, by each of the plurality of meta-learning modules, 2D image features of features according to multi-sensor-specific times; generating, by each of the plurality of meta-learning modules, 3D volume features by accumulating 2D image features in a depth direction according to multiple sensors; learning, by each of the plurality of meta-learning modules, 3D volume features in parallel through multi-sensor-specific learning modules; and aggregating results of the learning of the plurality of meta-learning modules and determining whether there is an anomaly in a plant pipe according to a result of learning selected based on an optimal combination of multiple features, multiple sensors, and multiple packet sections.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
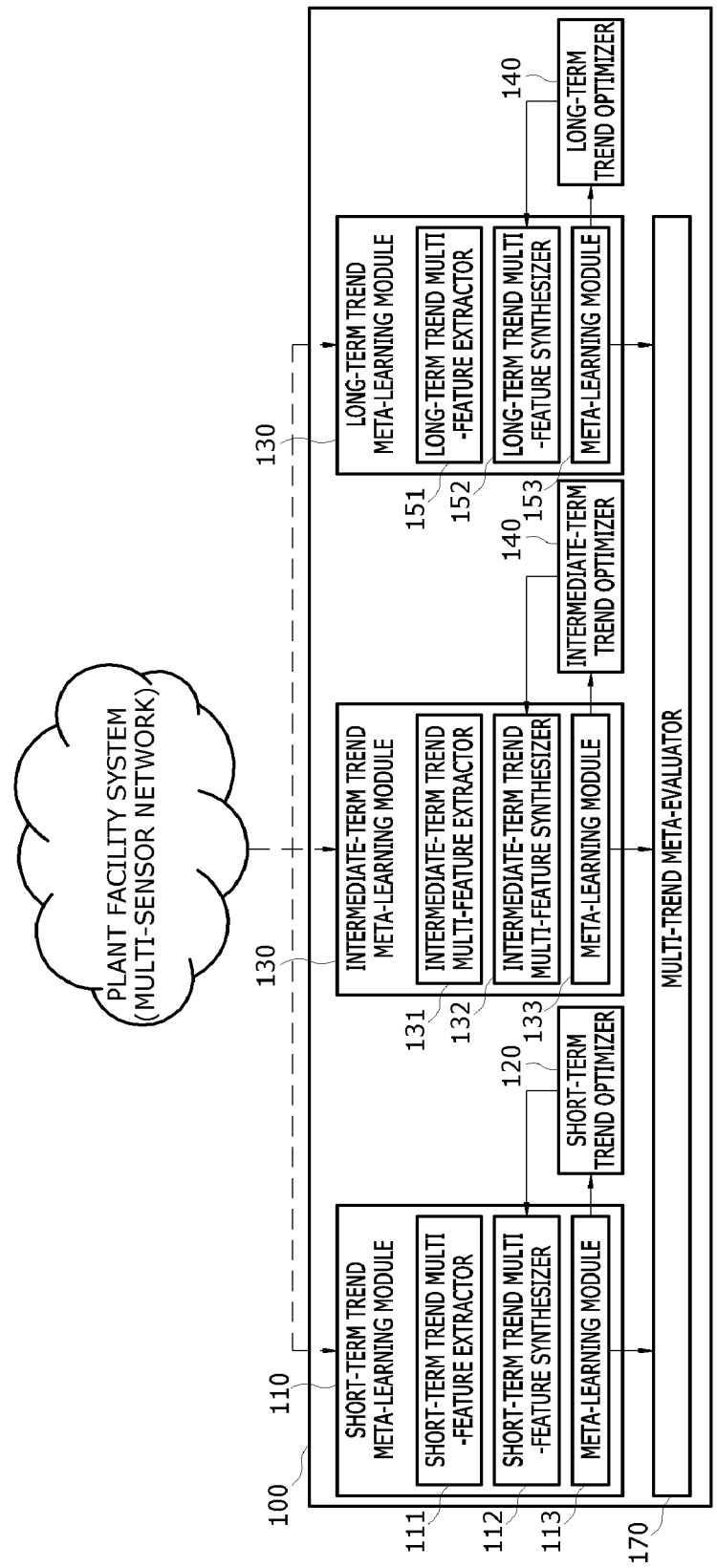
FIG. 1 is a block diagram of an apparatus for detecting an anomaly in a plant pipe according to an exemplary embodiment of the present invention.

Hereinafter, exemplary embodiments of the present invention will be described in detail with reference to the accompanying drawings so that those of ordinary skill in the art may easily implement the exemplary embodiments. The exemplary embodiments may, however, be embodied in many different forms and is not limited to the embodiments set forth herein. In the drawings, parts irrelevant to the description are omitted to clearly describe the present invention, and like reference numerals denote like elements throughout the specification. In description of drawings, elements indicated by the same name may have different reference numerals depending on the drawings. Reference numerals are only for convenience of description, and a concept, features, functions, or effects of each element are not interpreted in a limiting manner due to a reference numeral thereof.

Throughout the specification, when a part is referred to as being "connected" to another part, it may not only be "directly connected" to the other part but also may be "electrically connected" to the other part via an intervening element. When a certain part is referred to as "including" a certain component, this does not exclude other components unless described otherwise, and other components may be further included. It should be understood that "including" does not preclude the presence or addition of one or more other features, steps, numbers, operations, components, parts, and combinations thereof.

As used herein, the term "unit" or "module" includes a unit implemented by hardware or software and a unit implemented hardware and software. One unit may be implemented using two or more pieces of hardware, and two or more units may be implemented by one piece of hardware.

An apparatus and method for detecting an anomaly in a plant pipe according to an exemplary embodiment of the present invention which will be described below extract a plurality of trend-specific two dimensional (2D) image features by simultaneously considering multiple trends of a short-term trend, an intermediate-term trend, and a long-term trend of measured time-series data of each sensor installed in a plant pipe, generate three dimensional (3D) volume features by fusing the 2D image features, and performs meta-learning for anomaly detection and prediction. Here, a meta-learning method applied to an exemplary embodiment of the present invention involves performing optimal parallel learning according to a plurality of trends and multi-sensor features. Also, the meta-learning method involves simultaneously combining sensor-specific different features or different sensor volume features and optimizing parameters related to multiple trends to generate volume features using a global optimization technique such as a genetic algorithm in a learning process.

An apparatus and method for detecting an anomaly in a plant pipe according to an exemplary embodiment of the present invention which detect and predict an anomaly in a plant pipe based on multiple meta-learning will be described below in detail with reference to drawings.

FIG. 1 is a block diagram of an apparatus for detecting an anomaly in a plant pipe according to an exemplary embodiment of the present invention.

As shown in FIG. 1, an apparatus 100 for detecting an anomaly in a plant pipe includes a short-term trend meta-learning module 110, a short-term trend optimizer 120, an intermediate-term trend meta-learning module 130, an intermediate-term trend optimizer 140, a long-term trend meta-learning module 150, a long-term trend optimizer 160, and a multi-trend meta-evaluator 170.

In other words, the apparatus 100 for detecting an anomaly in a plant pipe according to an exemplary embodiment of the present invention includes the short-term trend meta-learning module, the intermediate-term trend meta-learning module, and the long-term trend meta-learning module that individually acquire in real time time-series data measured by a plurality of sensor devices separately installed in pipes of a plant facility, and includes optimizers for finding optimal combinations of multi-sensor features according to trend and the multi-trend meta-evaluator for finally evaluating whether an anomaly has been detected by considering all the multiple trends.

The short-term trend meta-learning module 110 is composed of a short-term trend multi-feature extractor 111, a short-term trend multi-feature synthesizer 112, and a meta-learning module 113, and performs learning for real-time anomaly detection in time-series data input from a plurality of sensor devices.

The intermediate-term trend meta-learning module 130 is composed of an intermediate-term trend multi-feature extractor 131, an intermediate-term trend multi-feature synthesizer 132, and a meta-learning module 133, and performs learning for anomaly detection by observing an intermediate-term trend of the time-series data input from the plurality of sensor devices.

The long-term trend meta-learning module 150 is composed of a long-term trend multi-feature extractor 151, a long-term trend multi-feature synthesizer 152, and a meta-learning module 153, and performs learning for anomaly detection by observing a long-term trend of the time-series data input from the plurality of sensor devices.

The multi-trend meta-evaluator 170 finally evaluates whether an anomaly has been detected by considering results of learning of the short-term trend meta-learning module 110, the intermediate-term trend meta-learning module 130, and the long-term trend meta-learning module 150 together.

The short-term trend optimizer 120, the intermediate-term trend optimizer 140, and the long-term trend optimizer 160 generate optimal volume features by automatically combining sensor-specific multiple features through a global optimization technique (e.g., a genetic algorithm) based on models and costs learned according to trend, and optimize multiple trend sections and parallel learning between different sensor volume features.

A meta-learning process through the short-term trend meta-learning module 110 will be described in detail below with reference to FIGS. 2 to 8.

First, the short-term trend multi-feature extractor 111 will be described with reference to FIGS. 2 to 5.

Figure 2:
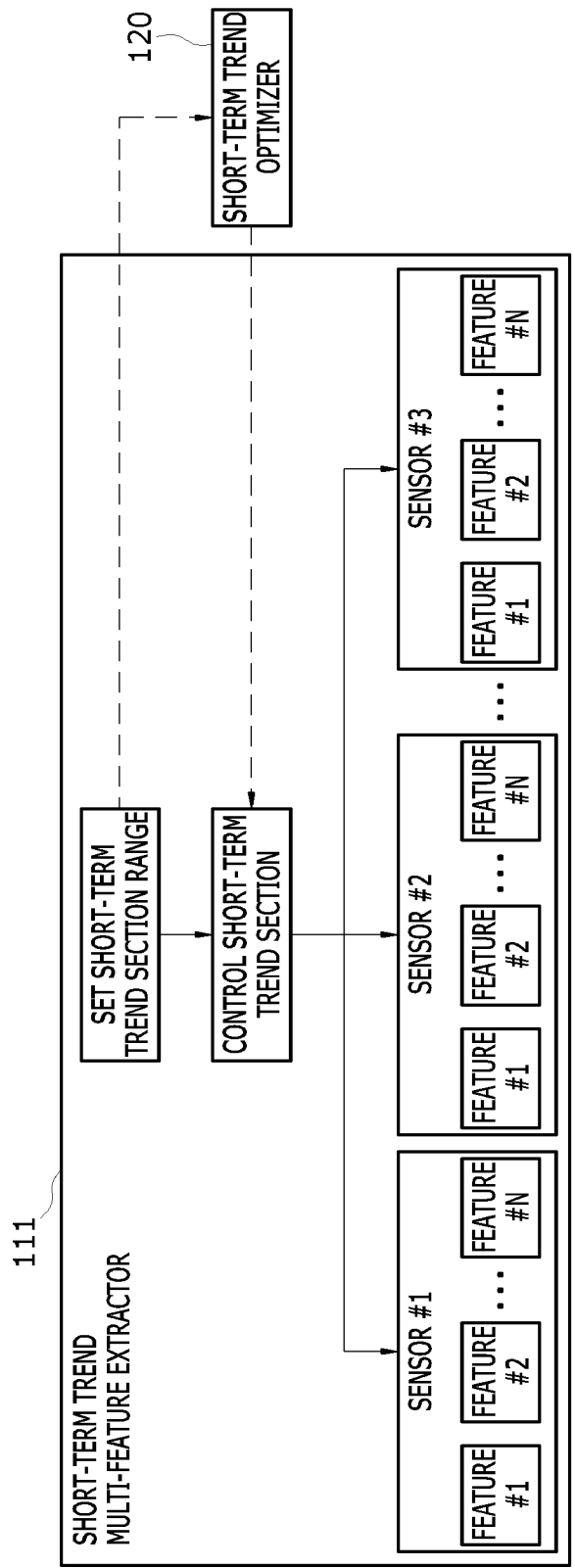
FIG. 2 is a conceptual diagram illustrating operation of a short-term trend multi-feature extractor according to an exemplary embodiment of the present invention.

FIG. 2 is a conceptual diagram illustrating operation of a short-term trend multi-feature extractor according to an exemplary embodiment of the present invention.

Figure 3:
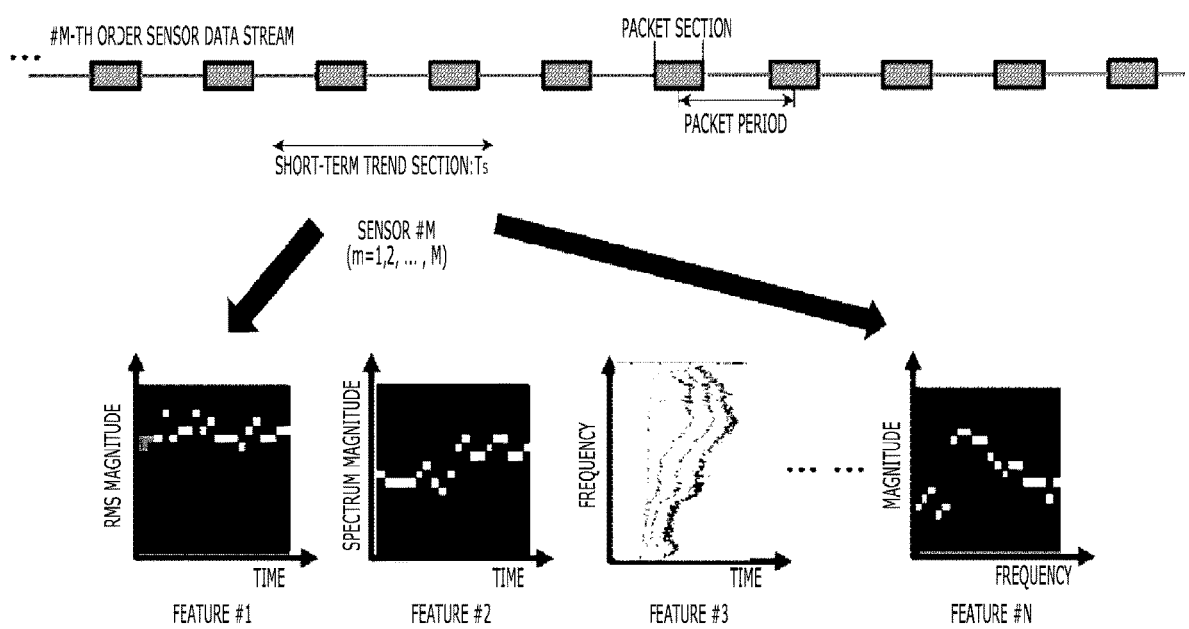
FIG. 3 is an example diagram of sensor-specific short-term trend multi-feature image extraction according to an exemplary embodiment of the present invention.
Figure 4:
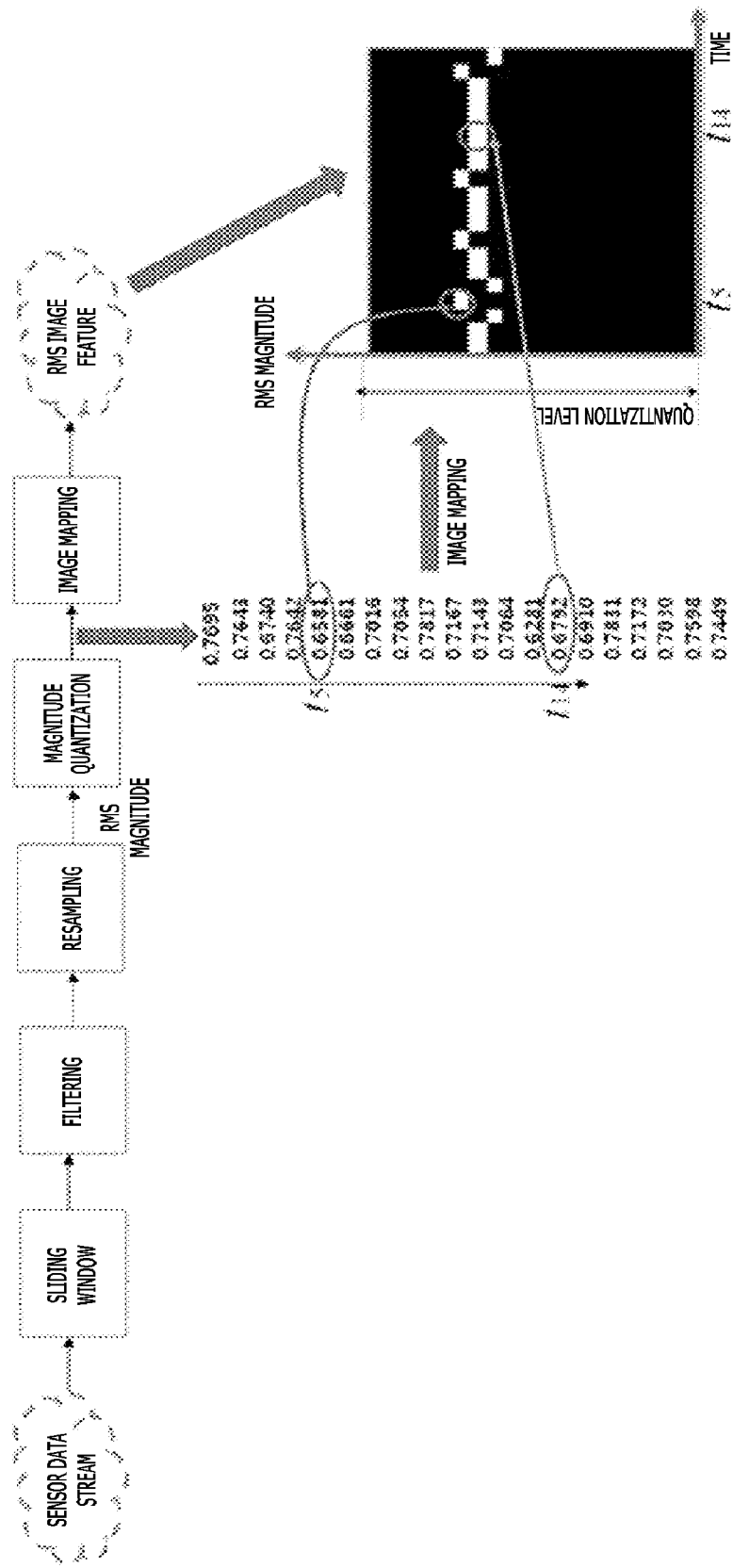
FIG. 4 is an example diagram of root mean square (RMS) magnitude image feature extraction applied to FIG. 3.
Figure 5:
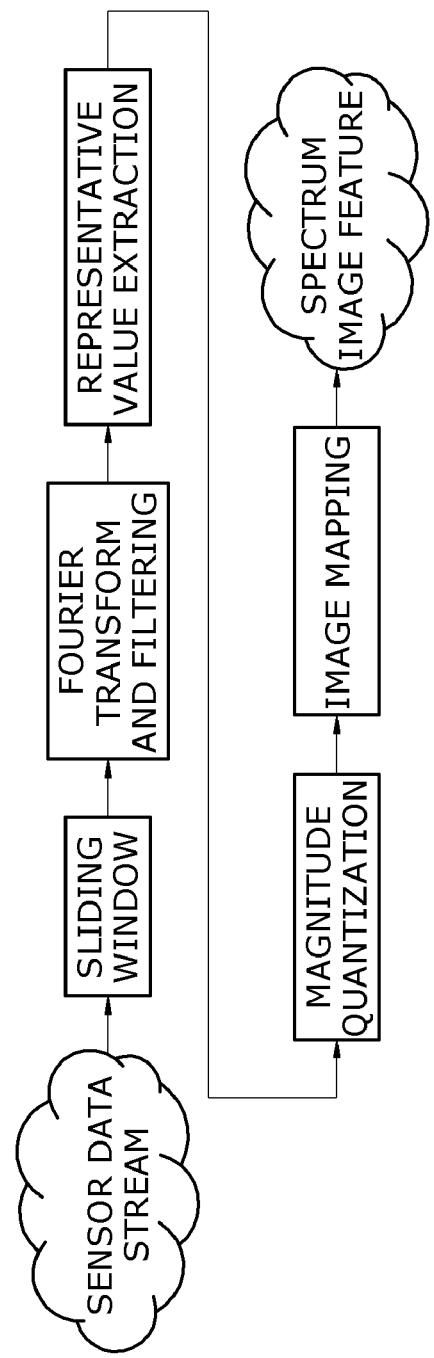
FIG. 5 is an example diagram of time-dependent spectrum magnitude image feature extraction applied to FIG. 3.

FIG. 3 is an example diagram of sensor-specific short-term trend multi-feature image extraction according to an exemplary embodiment of the present invention, FIG. 4 is an example diagram of root mean square (RMS) magnitude image feature extraction applied to FIG. 3, and FIG. 5 is an example diagram of time-dependent spectrum magnitude image feature extraction applied to FIG. 3.

As shown in FIG. 2, the short-term trend multi-feature extractor 111 of the short-term trend meta-learning module 110 extracts a plurality of, N, short-term trend features per sensor from a plurality of, M, pieces of time-series sensor data that are periodically measured.

Referring to FIG. 3, the short-term trend multi-feature extractor 111 collects data from a periodically measured $m^{th}$ order sensor data stream (m=1, 2, . . . , and M) in a short-term trend section $T_s$ composed of one or a few packet sections, and extracts N image features suitable for detecting and predicting leakage of a plant pipe. Here, the short-term trend optimizer 120 may receive a short-term trend section range defined by a user, calculate an optimal $T_s$ using a global optimization technique, and control a short-term trend section.

For example, "feature #1" shown in FIG. 3 is a feature obtained by mapping a time-series sensor data stream to a time-dependent image to express a short-term RMS level trend.

In other words, as shown in FIG. 4, RMS magnitudes are extracted through sliding window, filtering, and resampling processes. Then, the extracted magnitudes are quantized (i.e., the analog value is expressed as a digital value), and RMS magnitude values are mapped to positions corresponding to pixels of times and quantized magnitudes in a predefined image domain (i.e., a time-RMS magnitude domain) such that an RMS image feature is generated. Before the RMS magnitude values are mapped to the positions, an entire initial image domain is filled with zero. In other words, in the output RMS image feature, values other than zero are only present along a magnitude pixel trajectory according to time, and thus the output RMS image feature shows a sparse density.

"feature #2" shown in FIG. 3 is a feature obtained, to express a trend of frequency spectrum magnitude according to time, by converting the time-series sensor data stream into the frequency domain, calculating representative values of the converted time-series sensor data stream, and then mapping the representative values to a time-dependent image.

In other words, as shown in FIG. 5, a desired frequency spectrum region of a signal is filtered through sliding window and Fourier transform and filtering processes. Since a spectrum magnitude of an audio frequency band of an acoustic signal tends to increase overall when a plant pipe slightly leaks, representative spectrum magnitude values, such as a maximum, an arithmetical average, a geometrical average, a weighted average, and the like of spectrum magnitudes of a filtered audio frequency band are extracted in a representative value extraction process. Then, the extracted representative values are quantized, and the representative spectrum magnitude values are mapped to positions corresponding to pixels of times and quantized magnitudes in a predefined image domain (i.e., a time-spectrum magnitude domain) such that a spectrum-magnitude image feature is generated. In the output spectrum-magnitude image feature also, representative spectrum values other than zero are only present along a magnitude pixel trajectory according to time, and thus the output spectrum-magnitude image feature shows a sparse density.

"feature #3" shown in FIG. 3 is an image feature obtained by applying a time-frequency analysis technique to the time-series sensor data stream to express a time-frequency domain as a 2D domain.

Next, the short-term trend multi-feature synthesizer 112 will be described with reference to FIG. 6A and FIG. 6B.

Figure 6A:
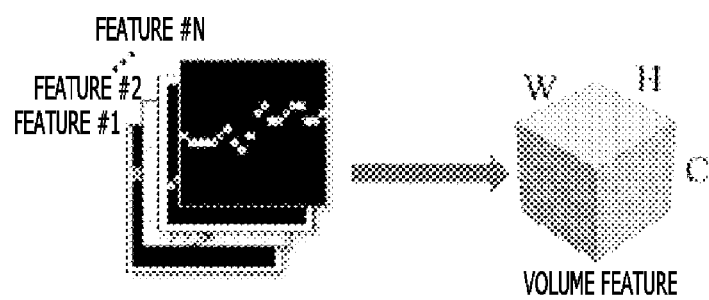
FIG. 6A and FIG. 6B are conceptual diagrams illustrating operation of a short-term trend multi-feature synthesizer according to an exemplary embodiment of the present invention.
Figure 6B:
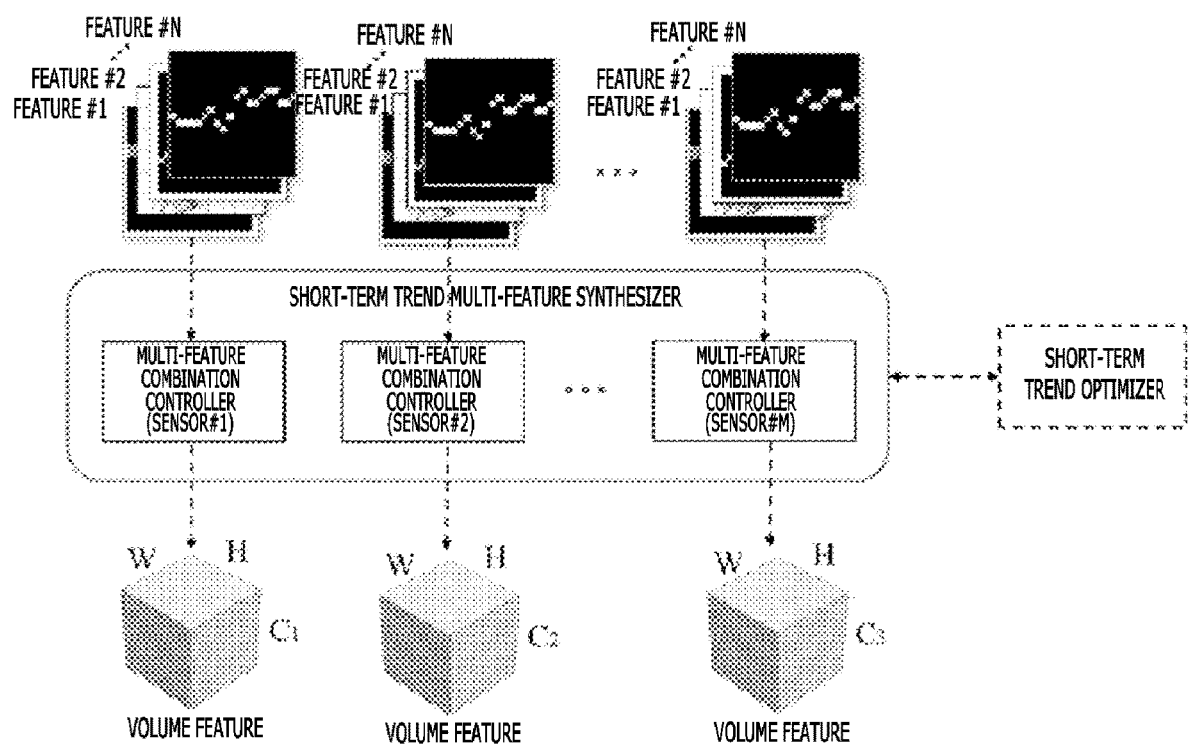

FIG. 6A and FIG. 6B are conceptual diagrams illustrating operation of a short-term trend multi-feature synthesizer according to an exemplary embodiment of the present invention.

As shown in FIG. 6A, the short-term trend multi-feature synthesizer 112 of the short-term trend meta-learning module 110 generates a 3D volume feature by accumulating several 2D image features, which are extracted in advance, in a depth direction (indicated by "C" in FIG. 6A). When N image features are generated per sensor, a volume feature depth C equals N.

In other words, as shown in FIG. 6B, the short-term trend multi-feature synthesizer 112 may include a plurality of multi-feature combination controllers, and the multi-feature combination controllers may separately correspond to sensors. To improve the performance of detecting and predicting an anomaly in a plant pipe, the short-term trend optimizer 120 performs optimization by automatically combining N image features per sensor through the multi-feature combination controllers. Such an optimization operation of the short-term trend optimizer 120 will be described in detail below with reference to FIG. 8.

Next, the meta-learning module 113 will be described with reference to FIG. 7.

Figure 7:
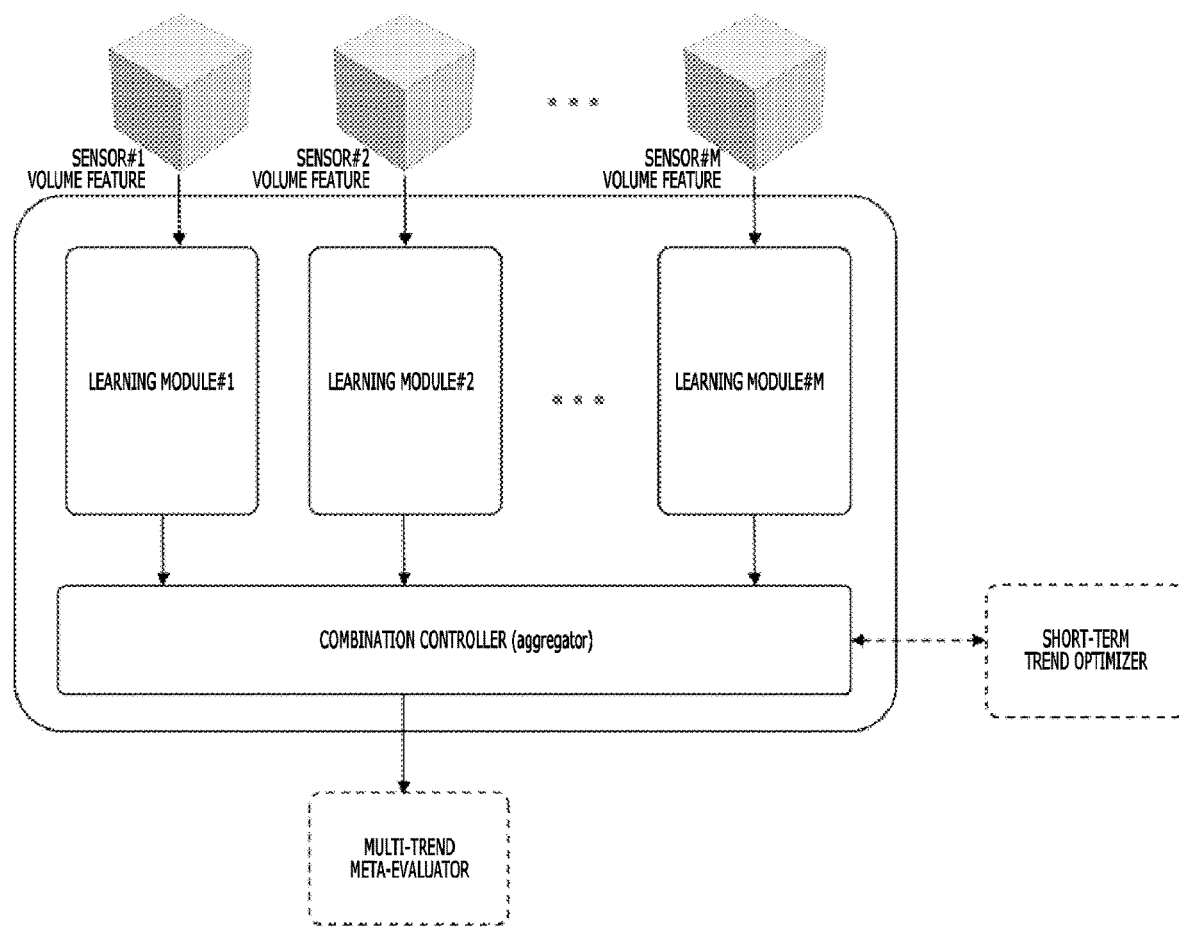
FIG. 7 is a conceptual diagram illustrating a parallel learning operation of a meta-learning module according to an exemplary embodiment of the present invention.

FIG. 7 is a conceptual diagram illustrating a parallel learning operation of a meta-learning module according to an exemplary embodiment of the present invention.

As shown in FIG. 7, the meta-learning module 113 of the short-term trend meta-learning module 110 includes learning modules (shown as learning modules #1 to #M in FIG. 7) separately corresponding to the above-described multi-feature combination controllers, and a combination controller that aggregates results of learning of the plurality of learning modules.

The M learning modules of the meta-learning module 113 separately receive M volume features that are output from the short-term trend multi-feature synthesizer 112 regarding M sensor devices. The M learning modules of the meta-learning module 113 learn sensor-specific volume features in parallel, and calculate and transfer costs of the learning to the combination controller. Here, the costs may be calculated using results including at least one of learning models learned by the learning modules, accuracy, and complexity. The short-term trend optimizer 120 controls the combination controllers based on results of learning performed by the M learning modules so that learning is repeatedly performed until an optimal combination is made according to cost.

The short-term trend optimizer 120 will be described in detail below with reference to FIG. 8.

Figure 8:
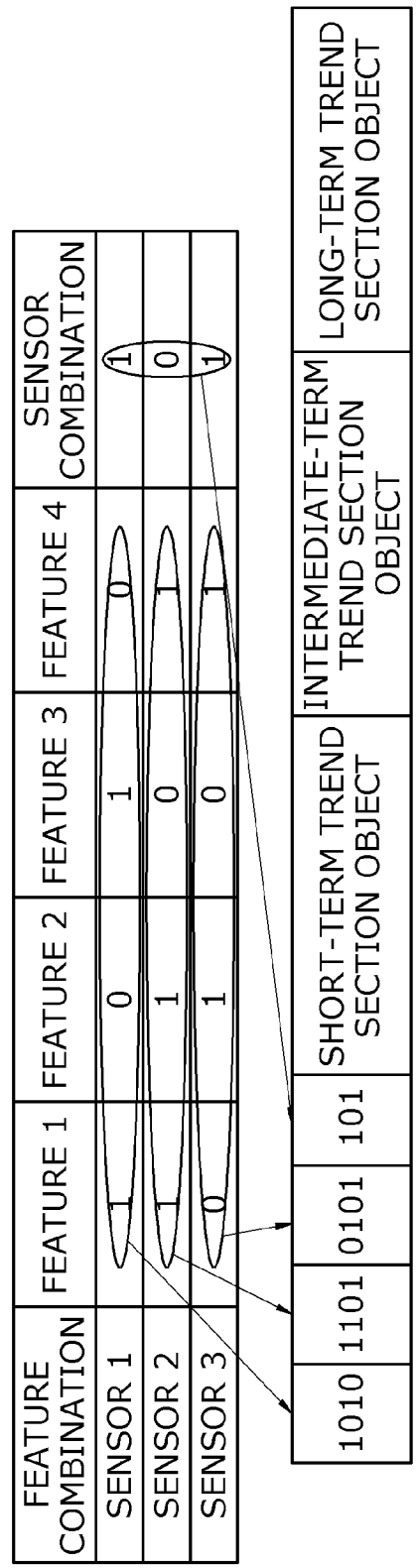
FIG. 8 is an example diagram of generating a genome including multiple sensors, features, and objects in trend sections.

FIG. 8 is an example diagram of generating a genome including multiple sensors, features, and objects in trend sections.

The short-term trend optimizer 120 optimizes short-term trend section control, sensor-specific multi-feature combination control, and meta-learning module combination control respectively performed by the short-term trend multi-feature extractor 111, the short-term trend multi-feature synthesizer 112, and the meta-learning module 113 using a global optimization technique. Here, the short-term trend optimizer 120 may use a genetic algorithm among global optimization techniques.

Specifically, as shown in FIG. 8, the short-term trend optimizer 120 generates initial groups of objects obtained by combining binary information of multiple features and multiple sensors. In other words, it is possible to configure one genome by combining objects including on/off information of sensor-specific multiple features, objects including on/off information of parallel learning of multiple sensors, and objects expressing trend sections. In FIG. 8, a value "1" denotes inclusion in feature generation and learning, and a value "0" denotes exclusion from feature generation and learning. The initial groups generated as such a combination are transferred to the short-term trend multi-feature extractor 111, the short-term trend multi-feature synthesizer 112, and the meta-learning module 113. Then, trend section setting, feature generation, and parallel learning configuration are learned according to genomic combination with learning models having the same number as the initial groups, and costs are calculated for evaluation. The costs may be calculated using results including learning models learned by the learning modules, accuracy, complexity, and the like.

When a cost function does not satisfy a desired condition, a new group of feature combination, sensor combination, and trend section setting is generated through crossover and mutation processes in which genetic operators are used. Accordingly, the generated new group is transferred back to the short-term trend metal-learning module 110 for learning, and costs are calculated for evaluation. Therefore, until a condition of evaluation based on a cost function is satisfied, processes, such as generation of a new group in which genetic operation is used, feature and sensor combination, trend section setting, cost evaluation after learning, and the like, are repeatedly performed.

The intermediate-term trend meta-learning module 130 and the long-term meta-learning module 150 will be described below with reference to FIGS. 9 and 10.

Figure 9:
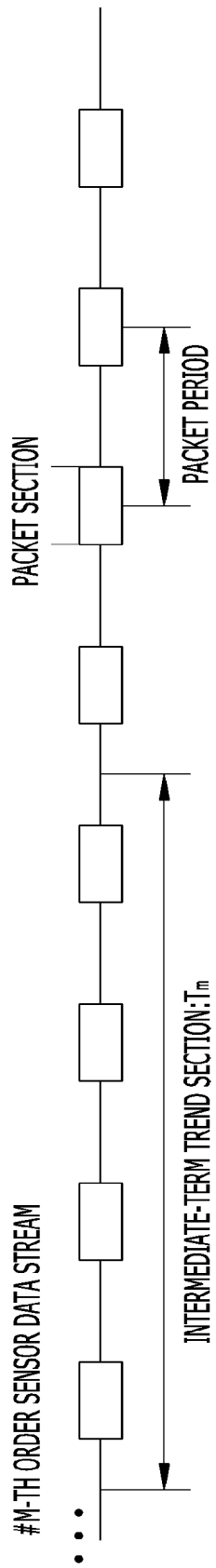
FIG. 9 is an example diagram of extracting a sensor-specific intermediate-term trend multi-feature image according to an exemplary embodiment of the present invention.

FIG. 9 is an example diagram of extracting a sensor-specific intermediate-term trend multi-feature image.

Since a structure of the intermediate-term trend meta-learning module 130 and operation performed by individual components thereof correspond to the structure and operation of the short-term trend meta-learning module 110 described above with reference to FIGS. 2 to 8, description of the detailed structure will be omitted.

However, the intermediate-term trend meta-learning module 130 sets a packet section for a plurality of, M, pieces of time-series sensor data to be longer than a short-term trend section $T_s$ for processing.

In other words, as shown in FIG. 9, the intermediate-term trend multi-feature extractor 131 of the intermediate-term trend meta-learning module 130 collects data from the plurality of, M, pieces of time-series sensor data that are periodically measured in an intermediate-term trend section $T_m$ composed of several packet sections, and extracts a plurality of, N, intermediate-term trend image features per sensor.

Configurations and operation principles of the intermediate-term trend multi-feature synthesizer 132, the meta-learning module 133, and the intermediate-term trend optimizer 140 are the same as those of the short-term trend meta-learning module 110 and the short-term trend optimizer 120.

To improve performance, the intermediate-term trend meta-learning module 130 may expand meta-learning by setting a plurality of intermediate-term trend sections according to a user's definition. Also, as shown in FIG. 9, an intermediate-term trend section may be set to be double or more the short-term trend section.

Figure 10:
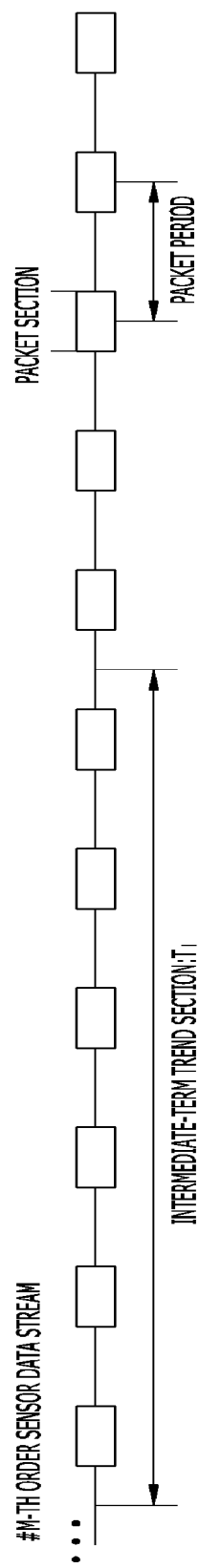
FIG. 10 is an example diagram of extracting a sensor-specific long-term trend multi-feature image according to an exemplary embodiment of the present invention.

FIG. 10 is an example diagram of extracting a sensor-specific long-term trend multi-feature image according to an exemplary embodiment of the present invention.

Since a structure of the long-term trend meta-learning module 150 and operation performed by individual components thereof correspond to the structure and operation of the short-term trend meta-learning module 110 described above with reference to FIGS. 2 to 8, description of the detailed structure will be omitted.

However, the long-term trend meta-learning module 150 sets a packet section for a plurality of, M, pieces of time-series sensor data to be longer than the intermediate-term trend section $T_m$ for processing.

In other words, as shown in FIG. 10, the long-term trend multi-feature extractor 151 of the long-term trend meta-learning module 150 collects data from the plurality of, M, pieces of time-series sensor data that are periodically measured in a long-term trend section $T_l$ composed of several packet sections, and extracts a plurality of, N, long-term trend image features per sensor.

Configurations and operation principles of the long-term trend multi-feature synthesizer 152, the meta-learning module 153, and the long-term trend optimizer 160 are the same as those of the short-term trend meta-learning module 110 and the short-term trend optimizer 120.

To improve performance, the long-term trend meta-learning module 150 may expand meta-learning by setting a plurality of long-term trend sections according to a user's definition. Also, as shown in FIG. 10, an intermediate-term trend section may be set to be triple or more the short-term trend section. Such intermediate-term and long-term trend sections are not limited in length, and may be set to random lengths as well as multiples.

Meanwhile, the multi-trend meta-evaluator 170 shown in FIG. 1 receives results learned by the above-described short-term trend meta-learning module 110, intermediate-term trend meta-learning module 130, and long-term trend meta-learning module 150 based on optimal combinations of trend-specific multiple features, multiple sensors, and trend sections. Subsequently, the multi-trend meta-evaluator 170 aggregates the received results and finally evaluates whether there is an anomaly in a plant pipe.

As aggregation processing, various methods, such as a majority voting process, a final determination process based on an arbitrary rule according to trend-specific results, a process of applying different weights to trends and summing the weighted trends, an ensemble learning process, and the like, may be used.

A method of detecting an anomaly in a plant pipe using multiple meta-learning according to an exemplary embodiment of the present invention will be described in detail below with reference to FIG. 11.

Figure 11:
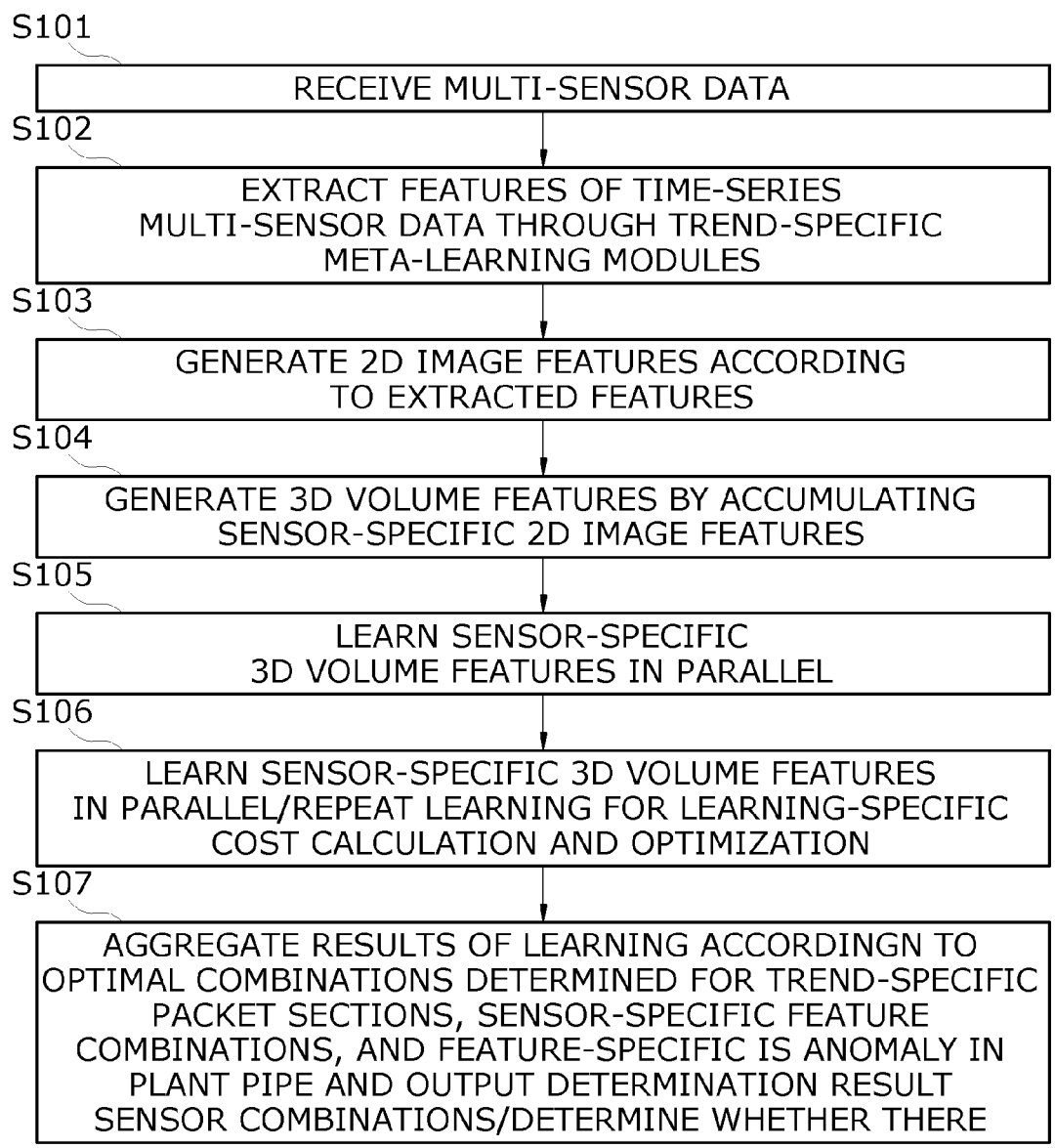
FIG. 11 is a flowchart illustrating a method of detecting an anomaly in a plant pipe using multiple meta-learning according to an exemplary embodiment of the present invention.

FIG. 11 is a flowchart illustrating a method of detecting an anomaly in a plant pipe using multiple meta-learning according to an exemplary embodiment of the present invention.

First, multi-sensor data sensed by multiple sensors included in a plant facility system is received (S101).

Here, a plurality of meta-learning modules that process packet section units of different lengths separately receive multi-sensor data in a time-series manner.

In an exemplary embodiment of the present invention, it is described that meta-learning modules are separately configured to learn short-term, intermediate-term, and long-term trends, but the number of meta-learning modules and lengths of packet sections being processed are not limited.

Next, preset packet sections of the time-series multi-sensor data are processed through the individual trend-specific meta-learning modules to extract features (S102).

Here, features of the sensor data may be set to a plurality of types. For example, as described above with reference to FIG. 3, at least one of an RMS magnitude, a spectrum magnitude, and a frequency feature according to time may be extracted as a feature of a sensor data stream, and various magnitudes of a frequency may be extracted as features.

For reference, a method of extracting multi-sensor-specific features is the same as that described above with reference to FIGS. 3 to 5.

Subsequently, a 2D image feature is generated by mapping the extracted plurality of features (i.e., multiple features) onto image domains of the individual features (S103).

After that, 3D volume features are generated by accumulating the 2D image features extracted according to the multiple sensors in a depth direction (S104).

Subsequently, learning modules separately corresponding to the multiple sensors learn the sensor-specific 3D volume features in parallel (S105).

Here, learning costs are calculated based on learning conditions (e.g., at least one of learning models, accuracy, and complexity) of the individual learning modules, and learning is repeated until an optimal combination (i.e., an optimal value) of the learning modules is obtained based on the learning costs (S106).

A global optimization technique (e.g., a genetic algorithm) may be used above to optimize control for setting packet sections according to trend (i.e., short-term, intermediate-term, and long-term trends), control for setting a combination of multiple features according to the multiple sensors, and control for setting a cost-dependent combination of learning modules according to learning module. In other words, an optimal combination is detected for a setting of trend-specific packet sections, a setting of multi-sensor-specific feature combinations, and a setting of a sensor combination.

After that, results of learning according to the optimal combination determined for trend-specific packet sections, sensor-specific feature combinations, and a sensor combination are aggregated to determine whether there is an anomaly in a plant pipe, and the determination result is output (S107).

As aggregation processing, any one processing method among a majority voting process, a final determination process based on a preset rule according to trend-specific results, a process of applying different weights to trends and summing the weighted trends to make a determination, and an ensemble learning process may be used.

The above-described method of detecting an anomaly in a plant pipe through an apparatus for detecting an anomaly in a plant pipe using multiple meta-learning according to an exemplary embodiment of the present invention may be implemented as a recording medium including a computer program stored in a computer-executable medium or a computer-executable command. As a computer-readable medium, the recording medium may be an arbitrary available medium that may be accessed by a computer, and may include volatile and non-volatile media, and separable and non-separable media. Further, the computer-readable medium may include a computer storage medium, which includes the volatile and non-volatile media, and the separable and non-separable media implemented using an arbitrary method or technology for storing information, such as a computer-readable command, a data structure, a program module, or other data.

Although a method and system of the present invention have been described with reference to specific embodiments, some or all of the components or the operations may be implemented using a computer system having a general-purpose hardware architecture.

According to the embodiments of the present invention described above, it is possible to extract various types of features of short-term, intermediate-term, and long-term trends of each sensor from data measured by various sensor devices by applying an Internet of everything (IoE) environment to a plant pipe system, and to effectively detect and predict an anomaly by optimally fusing these features and sensors.

The above description of the present invention is exemplary, and those of ordinary skill in the art should appreciate that the present invention can be easily carried out in other detailed forms without changing the technical spirit or essential characteristics of the present invention. Therefore, exemplary embodiments of the present invention describe rather than limit the technical spirit of the present invention, and the scope of the present invention is not limited by these embodiments. For example, each component described as a single type may be implemented in a distributed manner, and likewise, components described as being distributed may be implemented as a coupled type.

It should be noted that the scope of the present invention is defined by the claims rather than the description of the present invention, and the meanings and ranges of the claims and all modifications derived from the concept of equivalents thereof fall within the scope of the present invention.

The present invention described above may be embodied as computer-readable code on a program recording medium. The computer-readable medium includes all types of storage devices configured to store data that can be read by a computer system. Examples of the computer-readable medium include a hard disk drive (HDD), a solid-state drive (SSD), a silicon disk drive (SDD), a read-only memory (ROM), a random-access memory (RAM), a compact disc (CD)-ROM, a magnetic tape, a floppy disk, an optical data storage device, and the like. In addition, the computer-readable medium may be implemented in the form of a carrier wave (e.g., transmission through the Internet).

Figure 12:
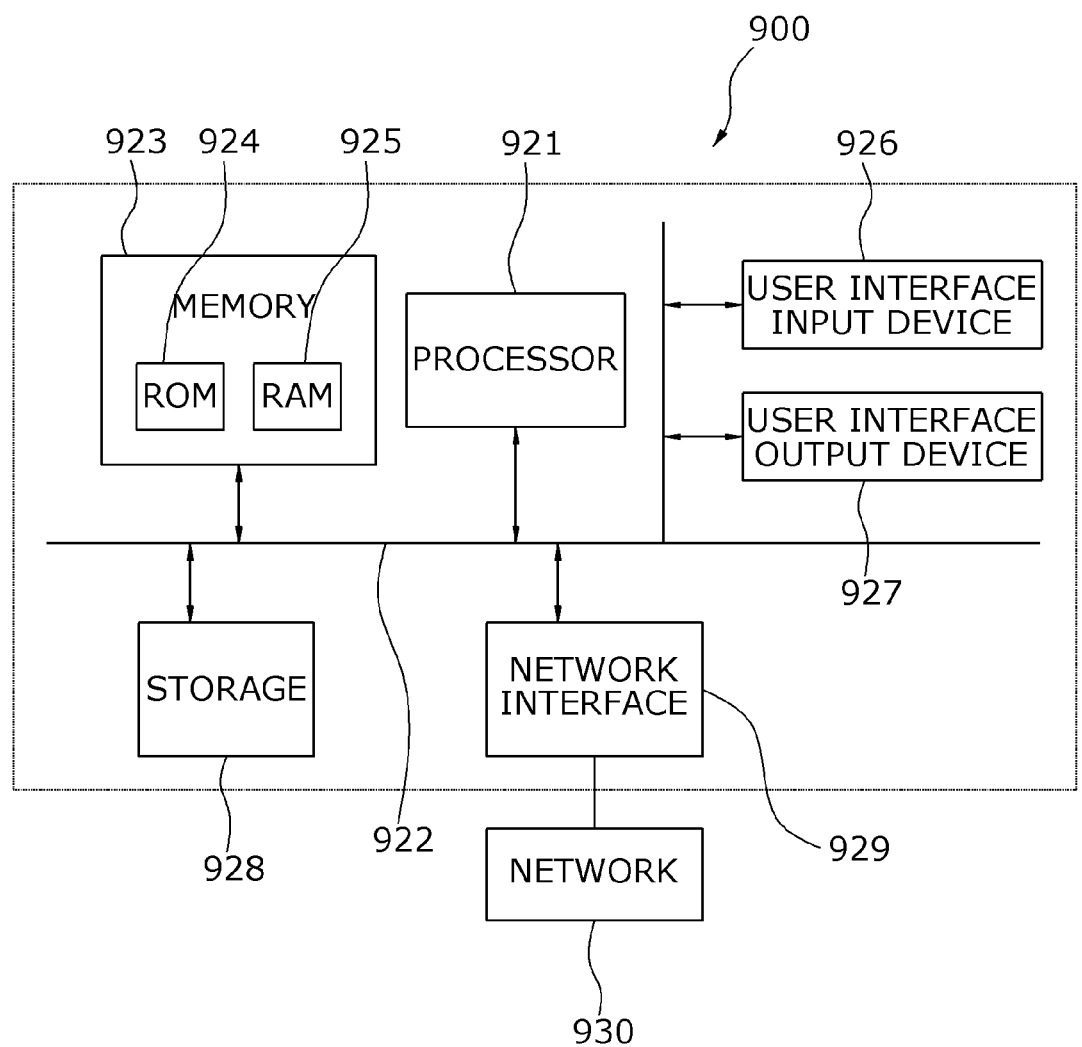
FIG. 12 is a view illustrating an example of a computer system in which a method according to an embodiment of the present invention is performed.

The method according to an embodiment of the present invention may be implemented in a computer system or may be recorded in a recording medium. FIG. 12 illustrates a simple embodiment of a computer system. As illustrated, the computer system may include one or more processors 921, a memory 923, a user input device 926, a data communication bus 922, a user output device 927, a storage 928, and the like. These components perform data communication through the data communication bus 922. Also, the computer system may further include a network interface 929 coupled to a network. The processor 921 may be a central processing unit (CPU) or a semiconductor device that processes a command stored in the memory 923 and/or the storage 928.

The memory 923 and the storage 928 may include various types of volatile or non-volatile storage mediums. For example, the memory 923 may include a ROM 924 and a RAM 925.

Thus, the method according to an embodiment of the present invention may be implemented as a method that can be executable in the computer system. When the method according to an embodiment of the present invention is performed in the computer system, computer-readable commands may perform the producing method according to the present invention.

The method according to the present invention may also be embodied as computer-readable codes on a computer-readable recording medium. The computer-readable recording medium is any data storage device that may store data which may be thereafter read by a computer system. Examples of the computer-readable recording medium include read-only memory (ROM), random access memory (RAM), CD-ROMs, magnetic tapes, floppy disks, and optical data storage devices. The computer-readable recording medium may also be distributed over network coupled computer systems so that the computer-readable code may be stored and executed in a distributed fashion.

Further, the above description is to be considered illustrative rather than restrictive in all aspects. The scope of the invention is to be interpreted in a sense defined by the appended claims, and the present invention covers all modifications provided they come within the scope of the appended claims and their equivalents.

What is claimed is:

1. An apparatus for detecting an anomaly in a plant pipe using multiple meta-learning, the apparatus comprising:
a plurality of meta-learning modules configured to separately receive multi-sensor data streams from a plurality of sensors for processing sensing of a plant pipe and to process meta-learning with sensor data of packet section ranges set according to trend from an arbitrary reception time point; and
a multi-trend meta-evaluator configured to detect an anomaly in the plant pipe by aggregating processing results of the meta-learning modules and to output a detection result,
wherein the plurality of meta-learning modules process multi-sensor data of packet sections having different lengths from the arbitrary reception time point,
each of the meta-learning modules generates two-dimensional (2D) image features by extracting one or more preset types of features from multi-sensor data collected from a set packet section range, generates three-dimensional (3D) volume features by accumulating the 2D image features in a depth direction according to the plurality of sensors, and learns the 3D volume features in parallel through learning modules separately corresponding to the sensors, and
the multi-trend meta-evaluator determines whether there is an anomaly in the plant pipe by aggregating results learned based on optimal combinations of multiple features, multiple sensors, and multiple packet sections according to the plurality of meta-learning modules.

2. The apparatus of claim 1, wherein the plurality of meta-learning modules comprise:
a short-term trend meta-learning module configured to process sensor data of a first packet section range;
an intermediate-term trend meta-learning module configured to process sensor data of a second packet section range exceeding the first packet section range; and
a long-term trend meta-learning module configured to process sensor data of a third packet section range exceeding the second packet section range.

3. The apparatus of claim 1, further comprising a plurality of optimizers separately corresponding to the plurality of meta-learning modules and configured to perform control so that optimal combinations are detected for a setting of packet section ranges according to the meta-learning modules, a setting of a combination of the one or more preset types of features, and a setting of a sensor combination resulting from learning costs of the individual learning modules,
wherein the optimizers detect the optimal combinations using a global optimization technique.

4. The apparatus of claim 3, wherein the optimizers detect the optimal combination using a genetic algorithm technique.

5. The apparatus of claim 1, wherein each of the meta-learning modules extracts features regarding at least one of a root mean square (RMS) magnitude, a spectrum magnitude, and a frequency feature according to time from the multi-sensor data.

6. The apparatus of claim 5, wherein each of the meta-learning modules extracts the RMS magnitude according to time by performing sliding window, filtering, resampling, and magnitude quantization on the multi-sensor data, and generates an RMS magnitude image feature by mapping the extracted RMS magnitude to a time-RMS magnitude domain.

7. The apparatus of claim 5, wherein each of the meta-learning modules extracts the spectrum magnitude according to time by performing sliding window, Fourier transform, filtering, representative value extraction, and magnitude quantization on the multi-sensor data, and generates a spectrum magnitude image feature by mapping the extracted spectrum magnitude to a time-spectrum magnitude domain.

8. The apparatus of claim 5, wherein features extracted by each of the meta-learning modules only have values along a magnitude pixel trajectory according to time in an image domain, and
the image domain other than the magnitude pixel trajectory is filled with zero such that the features have a sparse density.

9. The apparatus of claim 1, wherein the multi-trend meta-evaluator processes the aggregation according to any one method among majority voting, a process of making a final determination on learning results of the individual meta-learning modules according to a preset rule, a process of applying different weights to the meta-learning modules and summing weighted trends to make a determination, and ensemble learning.

10. A method of detecting an anomaly in a plant pipe through an apparatus for detecting an anomaly in a plant pipe using multiple meta-learning, the method comprising:
receiving, by each of a plurality of meta-learning modules configured to process different packet section ranges, a multi-sensor data stream about a plant pipe;
extracting, by each of the plurality of meta-learning modules, one or more preset types of features from sensor data of packet section ranges set according to trend from an arbitrary reception time point;
generating, by each of the plurality of meta-learning modules, two dimensional (2D) image features of features according to multi-sensor-specific times;
generating, by each of the plurality of meta-learning modules, three dimensional (3D) volume features by accumulating 2D image features in a depth direction according to multiple sensors;
learning, by each of the plurality of meta-learning modules, 3D volume features in parallel through multi-sensor-specific learning modules; and
aggregating results of the learning of the plurality of meta-learning modules and determining whether there is an anomaly in a plant pipe according to a result of learning selected based on an optimal combination of multiple features, multiple sensors, and multiple packet sections.

11. The method of claim 10, wherein the plurality of meta-learning modules comprise:
a short-term trend meta-learning module configured to process sensor data of a first packet section range;
an intermediate-term trend meta-learning module configured to process sensor data of a second packet section range exceeding the first packet section range; and
a long-term trend meta-learning module configured to process sensor data of a third packet section range exceeding the second packet section range.

12. The method of claim 10, wherein the optimal combination is detected for a setting of packet section ranges according to the meta-learning modules, a setting of a combination of the one or more preset types of features, and a setting of a sensor combination resulting from learning costs of the individual learning modules through a global optimization technique.

13. The method of claim 12, wherein a genetic algorithm technique is used as the global optimization technique to detect the optimal combination.

14. The method of claim 10, wherein the extracting of the one or more preset types of features comprises extracting features regarding at least one of a root mean square (RMS) magnitude, a spectrum magnitude, and a frequency feature according to time from the multi-sensor data.

15. The method of claim 14, wherein when the extracting of the one or more preset types of features comprises extracting the RMS magnitude, the generating of the 2D image features comprises extracting the RMS magnitude according to time by performing sliding window, filtering, resampling, and magnitude quantization on the multi-sensor data, and generating an RMS magnitude image feature by mapping the extracted RMS magnitude to a time-RMS magnitude domain.

16. The method of claim 14, wherein when the extracting of the one or more preset types of features comprises extracting the spectrum magnitude, the generating of the 2D image features comprises extracting the spectrum magnitude according to time by performing sliding window, Fourier transform, filtering, representative value extraction, and magnitude quantization on the multi-sensor data, and generating a spectrum magnitude image feature by mapping the extracted spectrum magnitude to a time-spectrum magnitude domain.

17. The method of claim 10, wherein the determining of whether there is an anomaly in the plant pipe comprises processing the aggregation according to any one method among majority voting, a process of making a final determination on learning results of the individual meta-learning modules according to a preset rule, a process of applying different weights to the meta-learning modules and summing weighted trends to make a determination, and ensemble learning.

* * * * *